United States Patent [19]

Clark

[11] Patent Number: 4,547,773
[45] Date of Patent: Oct. 15, 1985

[54] CHARACTER DISPLAY PANELS AND PANEL DEVICES

[75] Inventor: Michael G. Clark, Malvern, England

[73] Assignee: National Research Development Corporation, London, England

[21] Appl. No.: 459,083

[22] Filed: Jan. 19, 1983

[51] Int. Cl.$^4$ ............................................. G09G 3/16
[52] U.S. Cl. ................................... 340/765; 340/776; 340/805
[58] Field of Search ............... 340/756, 755, 754, 753, 340/752, 784, 765, 775, 776, 805

[56] References Cited

U.S. PATENT DOCUMENTS

| | | | |
|---|---|---|---|
| 4,188,626 | 2/1980 | Frantz et al. | 340/756 X |
| 4,194,199 | 3/1980 | Shepherd et al. | 340/756 X |
| 4,206,459 | 6/1980 | Houryu et al. | 340/756 X |
| 4,241,344 | 12/1980 | Kmetz et al. | 340/756 X |
| 4,291,307 | 9/1981 | Peelle et al. | 340/756 |
| 4,309,699 | 1/1982 | Tauer | 340/756 X |
| 4,326,279 | 4/1982 | Shanks | 340/805 X |
| 4,342,031 | 7/1982 | Lapeyre | 340/756 |
| 4,386,350 | 5/1983 | Owaga | 340/765 |
| 4,412,214 | 10/1983 | Tanaka et al. | 340/765 |
| 4,462,025 | 7/1984 | Murakami et al. | 340/753 |

FOREIGN PATENT DOCUMENTS

| | | |
|---|---|---|
| 2065354 | 6/1981 | United Kingdom. |
| 1596705 | 8/1981 | United Kingdom. |

*Primary Examiner*—Gerald L. Brigance
*Assistant Examiner*—Vincent P. Kovalick
*Attorney, Agent, or Firm*—Pollock, Vande Sande and Priddy

[57] ABSTRACT

A multi-character multi-segment electrically addressable display panel. Character segments are defined at each of a number of adjacent locations by the overlap of two sets of electrodes. The electrodes of one set are each associated with a location and a group of one or more segments. The electrodes of the other set extend across each location and are associated with no more than one segment in each segment group. The panel is addressed using isogonal signals, e.g. pseudo-random binary sequence coded signals. The panel medium may be of dyed or undyed cholesteric-to-nematic phase change effect liquid crystal material, of low threshold or wide temperature range liquid crystal material.

10 Claims, 9 Drawing Figures

CHARACTER DISPLAY PANELS AND PANEL DEVICES

TECHNICAL FIELD

This invention concerns electrically addressable display panels, and panel devices for the display of characters—for example numerals, symbols or alphabet characters. Such panels and panel devices have application to calculator and instrument panel display and typically such panels incorporate an electrically sensitive medium—for example a medium of liquid crystal material—enclosed between sets of opposing electrodes defining several adjacent display areas. Each display area or unit comprises several display segments, various of which may be driven ON by the application of an appropriate electrical address to the electrodes defining those segments, to display any particular one of a set of characters. The invention is concerned particularly, although not exclusively, with panels and panel devices incorporating a dyed phase change liquid crystal material as the electrically sensitive medium.

BACKGROUND ART

Display panels incorporating 7-segment (7-bar figure-of-eight) and 8-segment (7-bar figure-of-eight + decimal point) display units are well known, and used both in calculators and digital instruments. Low-power consumption liquid crystal medium display panels are also well known, particularly those using the twisted nematic effect or the dynamic scattering effect.

Two forms of panel address are also well known, discrete address and time multiplexed address. For direct discrete address, the 7-segment display requires seven discrete front plane electrodes for each display unit and a common back-plane electrode. Where more than a few display units are required, the number of connections to the panel electrodes becomes prohibitively large. In general, the larger the number of connections, the lower is the production yield, and the higher is the production cost. This form of address therefore has very restricted application. On the other hand the number of connections required for time multiplexed address can be considerably smaller. For this the display segments of each display unit are defined by seven shaped electrodes front and back, various of these shaped electrodes being interconnected (eg GB Patent Specification No. 1596 705). However, in this technique selected segments are driven ON for only part of the address signal cycle, and the driving fields or voltages are changed between a maximum level and a minimum but finite level to drive the segments either ON or OFF. The ratio of maximum to minimum level is however limited and depends on the time multiplexed technique adopted. Furthermore the minimum level must be of sufficiently low level that segments are not inadvertently driven ON. Many liquid crystal media exhibit a low threshold above which the media changes to an ON state, a threshold often sensitive to temperature. Thus to optimize maximum level it is often necessary to incorporate electronic compensation for temperature change, accepting increase in unit costs. Certainly it is difficult, if not impossible, to achieve the angle of view, brightness, and contrast performance achieved by direct discrete address.

Panels incorporating dyed phase change liquid crystal media can provide attractive displays with excellent angle of view, good contrast, and reasonable brightness. Also for different color choice, a wide range of dyes can be used; there is a wide choice. However, these media usually have a rapid response, and exhibit substantial hysteresis—ie the voltages required to turn OFF segments ON, and ON segments OFF, can differ markedly, and the acceptable drive level minimum can be exceptionally low, making time multiplexed address techniques impractical.

Brief mention is made here of display panels, panels other than multi-segment display panels, that utilize isogonal signals for their address. GB Pat. No. 1,526,266 discloses a matrix display panel using three isogonal address signals, in particular three sinusoidal signals of like frequency and amplitude but which differ from each other in phase by $\pm 120°$. This panel may be used to display characters—for example the letter "L", but to do this the signals must be applied to the electrodes in a defined time sequence. The displayed character "L" is depicted by selected matrix elements that are held "OFF" against a background of all other matrix elements that are held "ON". It is a disadvantage that representative elements are held "OFF" for only part of the time, thus though to the observer's eye all representative elements may appear to be OFF simultaneously, the contrast is less than optimum. Better contrast is obtainable using the address technique disclosed in GB Patent Application No. 2,001,794A, a technique using pseudo-random binary sequency (p.r.b.s.) coded address signals. According to this technique a different p.r.b.s. signal is applied to each of the matrix row electrodes, and selected row signals are applied to the matrix column electrodes. Thus all matrix elements, except one selected in each column, are driven "ON". This technique is useful for displaying single valued waveforms, but since only one element per column may be used for display representation, this technique is not readily applicable to character display. P.r.b.s. coded address signals have also been used for index pointer displays—eg for clock and meter displays—cf GB Patent Application No. 2,044,975A.

SUMMARY OF THE INVENTION

This invention is intended to provide a remedy. In the panel display devices, means are provided to drive ON display segments continuously, using a different address technique. Furthermore using this technique, a minimum level of zero is attained and the maximum level is limited only by choice, allowing choice of level to optimize panel angle of view, brightness and contrast.

According to the invention there is provided a multi-character multi-segment electrically addressable display device, capable of displaying each one of a plurality of different display characters, the members of a character set, each at a plurality of adjacent locations, the device comprising:

a display panel having two sets of electrodes on each side of an electrically sensitive medium, each set mounted on a supporting substrate; and, panel address means connected to the display panel electrodes to apply continuous isogonal address signals thereto;

one set of electrodes overlapping the other set to define a plurality of display character segments at each location; wherein at each location electrodes of the one set are each associated with a different group of one or more segments, at least one electrode being associated with a group of two or more segments, and, wherein each electrode of the other set extends between and across each location, and is associated with no more than one segment in each group of segments, at least one electrode being associated with a plurality of groups at each location; the panel address means being responsive to control so to apply different isogonal signals to electrodes associated with selected segments to hold all the selected segments at each location ON simultaneously, and to apply identical isogonal signals to electrodes associated with non-selected segments to hold all the non-selected segments at each location OFF.

An isogonal set of signals has the property that the root mean square average difference of any two members of the set, is of constant value. This term is intended to include a set of orthogonal signals. Examples are Walsh function signals and pseudo-random binary sequence (p.r.b.s.) coded waveform signals.

Using these signals, the medium is driven ON wherever different signals are applied to opposite electrodes. The amplitude of the signals is therefore chosen to give a difference level of sufficiently high magnitude. Thus for example, using as the medium a dyed phase change liquid crystal material, this level is chosen to be above threshold maximum and is preferably chosen to have a value near or in excess of the saturation level to give optimum brightness. Like signals are applied to the opposite electrodes of all OFF segments, and result in a zero level difference.

The character display may be combined with a quasi-analogue display, for example a car dashboard display such as that described in copending GB Patent Application No. 2,206,298A, or an analogue watch or meter display such as that described in GB Patent Application No. 2,044, 975A, all electrodes being incorporated on common substrates, the character and analogue displays using a common signal generator.

BRIEF DESCRIPTION OF THE DRAWINGS

In the accompanying drawings.

DESCRIPTION OF THE PREFERRED EMBODIMENTS

Embodiments of the invention will now be described, by way of example only, with reference to the accompanying drawings.

Using an address comprising several isogonal waveform drive signals, it is possible to reduce the number of external connections required for a character display unit, provided that the unit is required to display characters comprising a restricted character set—for example the set of numeric characters, the numerals "0" to "9".

There are many ways of connecting the front and the back electrode parts of a display unit, but only some of these configurations are in general suitable for displaying a particular character set. A systematic approach is therefore needed to define suitable connection configurations, and to select from these a configuration allowing a minimum number of external connections. In the following text, a general design approach is adopted and it is illustrated by two examples—firstly the approach is applied to a 7-segment display unit, and, secondly, it is applied to a modified display unit, an 8-segment display unit.

Figure 1:
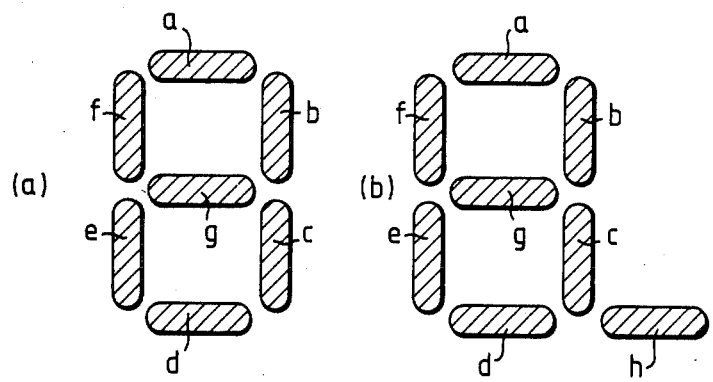
FIG. 1 shows
(a) the display segment arrangement of a 7-bar display unit,
and,
(b) the display segment arrangement of an 8-bar display unit, a simple modification of the 7-bar display unit.
Figure 2:
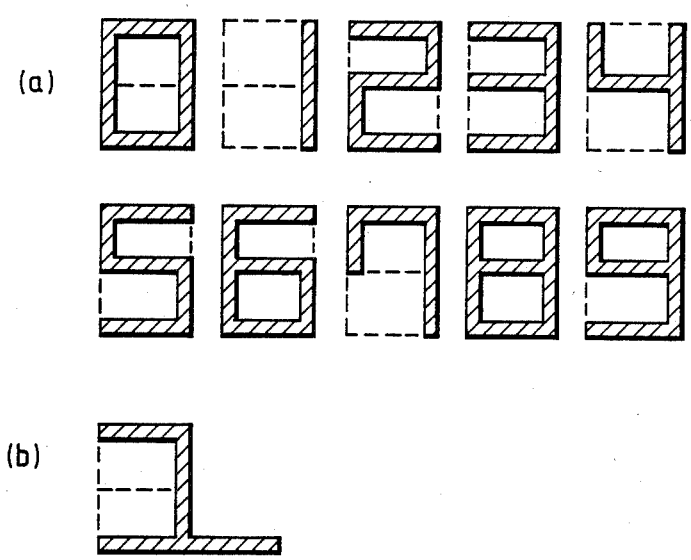
FIG. 2 shows
(a) a character font adopted for displaying the numerals 0 to 9 by the 7-bar display unit,
and,
(b) a modification of the numeral 1 display, adopted for the 8-bar display segment arrangement of FIG. 1(b) above.

Consider then the first of these examples, a 7-segment display unit required to display the numeric characters, the numerals "0" to "9". The arrangement of the seven display segments is of conventional figure-of-eight form comprising seven segments a to g arranged as shown in FIG. 1(a). The character font for the numerals "0" to "9" that may be displayed by this arrangement of seven segments is shown in FIG. 2(a). The different display segments a to g are provided by the overlap of a set of front electrodes and a set of back electrodes disposed either side of an electrically sensitive medium, and depending on the address that is applied to opposed segments, each segment will be driven ON or OFF. Different segments are driven ON for each displayed character. The different segments that are driven to display each of the characters "0" to "9" are summarized in Table 1 appearing below. In this table the "ON" segments are represented by logic symbol "1" and "OFF" segments by logic symbol "0".

The exponent symbol "E" may also be represented by a 7-segment display. The different segments driven for this character are also shown at the foot of this table.

TABLE 1

SEGMENT USAGE MATRIX (SUM)

Format: 7-bar, figure-of-eight
Character set: Numerals → 9; (or, 0 → 9, E).

| CHARACTER DISPLAYED | SEGMENTS DRIVEN | | | | | | |
|---|---|---|---|---|---|---|---|
| | a | b | c | d | e | f | g |
| "0" | 1 | 1 | 1 | 1 | 1 | 1 | 0 |
| "1" | 0 | 1 | 1 | 0 | 0 | 0 | 0 |
| "2" | 1 | 1 | 0 | 1 | 1 | 0 | 1 |
| "3" | 1 | 1 | 1 | 1 | 0 | 0 | 1 |
| "4" | 0 | 1 | 1 | 0 | 0 | 1 | 1 |
| "5" | 1 | 0 | 1 | 1 | 0 | 1 | 1 |
| "6" | 1 | 0 | 1 | 1 | 1 | 1 | 1 |
| "7" | 1 | 1 | 1 | 0 | 0 | 1 | 0 |
| "8" | 1 | 1 | 1 | 1 | 1 | 1 | 1 |
| "9" | 1 | 1 | 1 | 1 | 0 | 1 | 1 |
| ("E" | 1 | 0 | 0 | 1 | 1 | 1 | 1) |

Thus all segments are driven "ON" to represent numeral "8"; segments a, b, c and f are driven "ON" to represent numeral "7"; and so forth. It is noted that numeral "1" display corresponds to ON segments b and c only.

The many ways in which seven front electrodes can be grouped and interconnected are summarized in Table 2 appearing below. In this table the number of electrodes connected to form a group is represented by a number and the number of groups of like dimension is represented by a superscript. For example, where the electrodes are partitioned to form two pairs of connected electrodes and a single group of three connected electrodes, this partition is represented by the label $2^2.3$. The numbers of connections required for a display panel incorporating firstly a number N of adjacent units, and secondly eight display units, are shown in the right hand columns of the table:

TABLE 2

CONNECTION COUNT

Format: 7-bar

| PARTITION ($\Sigma n_j$) | No. OF GROUPS (m) | No. OF CONNECTIONS | |
|---|---|---|---|
| | | General N | N = 8 |
| 7 | 1 | 7 + N | 15 |
| 1.6 | 2 | 6 + 2 N | 22 |
| 2.5 | " | 5 + 2 N | 21 |
| 3.4 | " | 4 + 2 N | 20 |
| $1^2.5$ | 3 | 5 + 3 N | 29 |
| 1.2.4 | " | 4 + 3 N | 28 |
| $1.3^2$ | " | 3 + 3 N | 27 |
| $2^2.3$ | " | 3 + 3 N | 27 |
| $1^3.4$ | 4 | 4 + 4 N | 36 |
| $1^2.2.3$ | " | 3 + 4 N | 35 |
| $1.2^3$ | " | 2 + 4 N | 34 |
| $1^4.3$ | 5 | 3 + 5 N | 43 |
| → $1.2^2$ | " | 2 + 5 N | 42 ← |
| $1^5.2$ | 6 | 2 + 6 N | 50 |
| $1^7$ | 7 | 1 + 7 N | 57 |

The design problem therefore is to determine which of these partitions will allow display of the character set, and which one of the suitable partitions will result in a minimum number of external connections. The selection of suitable partitions can be much simplified using as a starting point the SUM, i.e., the matrix shown in Table 1. This matrix is inspected to determine which segment electrodes may be paired together— segments which are never required to be driven OFF together. This may be done by comparing columns of the matrix two at a time, associating only those segments which are represented by columns for which no rows contain logic "0" in both columns.

Alternatively, for computational purposes, the complement matrix formed by changing 0→1 and 1→0 may be used, treating each column as a multi-dimension vector and associating those segments corresponding to orthogonal vectors. This then results in a list of associated segments as follows:

(a,b); (a,c); (b,c)*; (b,d); (b,f); (b,g); (c,d); (c,e); (c,g).
[*Note: For the extended character set "0" to "9" and "E", the segments (b,c) are not associated and would not be included in the above list.]

Figure 3:
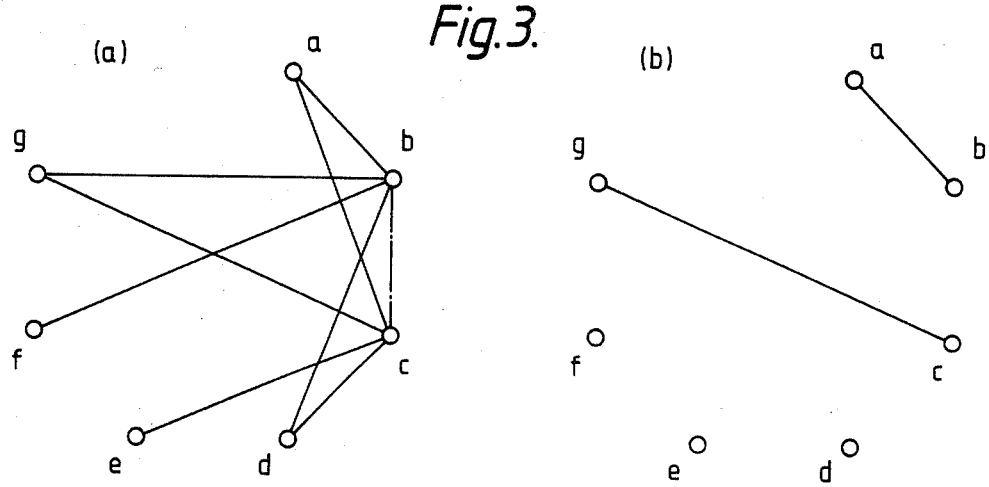
FIG. 3 shows
(a) a segment correlation graph corresponding to the conventional 7-bar segment arrangement and the character font shown in FIG. 2(a) above,
and,
(b) a sub-graph derived from this correlation graph.

These groupings for convenience are represented by a correlation graph—see FIG. 3(a), formed by treating each segment as a graph vertex and joining the vertices of associated segments. The allowed partitions can then be deduced by inspecting the correlation graph. This graph is decomposed, by cutting lines, to form complete sub-figures: points, lines, triangles, etc, and each sub-figure having the property that every vertex is joined to every other vertex of the sub-figure. One such decomposition is shown in sub-graph FIG. 3(b). The correlation graph (FIG. 3(a)) has been decomposed into three point sub-figures (d), (e) and (f) and two line sub-figures (a,b) and (e,g). This is not a unique solution, for other decompositions lead to other different partition groupings, eg:

(a,b); (c,e); (d); (f); (g); and (b,g); (c,e); (a); (d); (f); etc. This decomposition and the other decompositions given above are all examples of the partition $1^3 2^2$. The subgraph shown however, groups nearest neighbor segments a and b, c and g, and is thus convenient to implement as a configuration design for the front-plane electrodes. This design is implemented as shown in bold outline in FIG. 4.

The display is addressed by having a single data electrode for each electrode group—ie. each sub-figure, and separate strobe electrodes carrying different isogonal strobe waveforms for each vertex of the sub-figure. Since the strobe waveforms can be used over again for the different sub-figures, the minimum number required is only the largest sub-graph dimension occurring in the decomposition—in this case only two. Thus an N-digit display—ie a display having N adjacent display units—using the decomposition grouping shown in sub-graph FIG. 3(b), requires only (3+2).N+2 connections, a reduction of 2N−1 connections over direct drive. Just as the decomposition of the correlation graph is not in general unique, neither is the assignment of strobe functions to back place electrodes. One possible assignment of strobe signals ($f_1$, $f_2$) is given as follows:

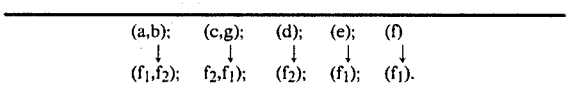

Thus, in the back-plane one common strobe electrode, the $f_1$-strobe electrode, is associated with display segments a, e, f and g; while a second common strobe electrode, the $f_2$-strobe electrode, is associated with display segments b, c and d. See FIG. 4, where the $f_1$-, and $f_2$-back plane electrodes are shown in broken outline.

Figure 4:
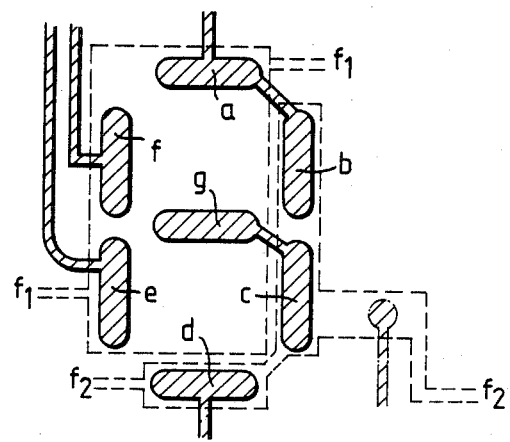
FIG. 4 is a plan drawing of a 7-bar display unit showing an optimal electrode connection configuration for the front and back electrodes, a configuration suitable for isogonal signal address.

Although in this particular case the design of artwork to implement the arrangement of FIG. 4 is feasible, in general solutions may be generated which are difficult or impossible to implement without unacceptable crossovers in the electrodes. It is in general desirable therefore to enumerate the possible solutions both to minimize the connection count and to choose electrode interconnections that are topologically possible and geometrically convenient. In general, the most favorable solutions will be those that decompose the correlation graph into sub-figures of approximately equal dimensions.

Alternative optimal electrode interconnections for the "front" electrode segments, suitable for isogonal signal address, other $1^3 2^2$ partitions, are listed as follows:

| | |
|---|---|
| (a,b) (c,d) (e) (f) (g); | (a,b) (c,e) (d) (f) (g); |
| (a,b) (c,g) (d) (e) (f); | (b,g) (c,d) (a) (e) (f); |
| (b,g) (c,e) (a) (d) (f); | (b,g) (a,c) (d) (e) (f); |
| (b,f) (c,d) (a) (e) (g); | (b,f) (c,e) (a) (d) (g); |
| (b,f) (c,g) (a) (d) (e); | (b,f) (a,c) (d) (e) (g); |
| (b,d) (c,e) (a) (f) (g); | (b,d) (c,g) (a) (e) (f); and |
| (b,d) (a,c) (e) (f) (g). | |

Each of these arrangements of the "front" electrodes may be combined with any arrangement of "back" electrodes in which each member of each of the pairs of "front" electrodes overlaps a different "back" electrode. For example, in the first arrangement of interconnections listed above the allowed overlaps are of the form:

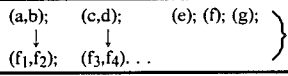

where, preferably, either $f_3 = f_1$ and $f_4 = f_2$ or $f_3 = f_2$ and $f_4 = f_1$ and the "front" electrodes for segments (e), (f) and (g) may overlap with any "back" electrode.

In the particular case described thus far, the connection count for an 8-digit 7-bar segment display is 42, fifteen less connections than are required for direct address.

Notwithstanding this reduction in the number of external connections required, the connection count is still relatively high. It can be shown that this is due to the low segment usage associated with the display of the character "1". Further improvements may be achieved by increasing the character "1" segment usage, introducing an extra segment and modifying the character font.

Thus, in this the second example, an 8-segment unit instead is used to display the numerals "0" to "9". This unit includes seven segments a to g arranged in figure-of-eight form as in the previous example FIG. 1(a), but it also includes an eighth segment h to the right and at the foot of the unit, adjacent segment d—see FIG. 1(b). The character font now used is similar to the font shown in FIG. 2(a) except that the form for display of numeral "1" has been modified as shown in FIG. 2(b). Thus the numeral "1" is displayed by driving ON display segment a, b, c, d and h and not merely segments b and c as before. The modified usage matrix for this display is shown in Table 3 appearing below:

TABLE 3

| SEGMENT USAGE MATRIX (SUM) | | | | | | | | |
|---|---|---|---|---|---|---|---|---|
| Format: | 8-bar | | | | | | | |
| Character set: | Numerals 0 → 9; (or, 0 → 9, E). | | | | | | | |
| CHARACTER | SEGMENTS DRIVEN | | | | | | | |
| DISPLAYED | a | b | c | d | e | f | g | h |
| "0" | 1 | 1 | 1 | 1 | 1 | 1 | 0 | 0 |
| "1" | 1 | 1 | 1 | 1 | 0 | 0 | 0 | 1 |

TABLE 3-continued

| SEGMENT USAGE MATRIX (SUM) | | | | | | | | |
|---|---|---|---|---|---|---|---|---|
| Format: | 8-bar | | | | | | | |
| Character set: | Numerals 0 → 9; (or, 0 → 9, E). | | | | | | | |
| CHARACTER | SEGMENTS DRIVEN | | | | | | | |
| DISPLAYED | a | b | c | d | e | f | g | h |
| "2" | 1 | 1 | 0 | 1 | 1 | 0 | 1 | 0 |
| "3" | 1 | 1 | 1 | 1 | 0 | 0 | 1 | 0 |
| "4" | 0 | 1 | 1 | 0 | 0 | 1 | 1 | 0 |
| "5" | 1 | 0 | 1 | 1 | 0 | 1 | 1 | 0 |
| "6" | 1 | 0 | 1 | 1 | 1 | 1 | 1 | 0 |
| "7" | 1 | 1 | 1 | 0 | 0 | 1 | 0 | 0 |
| "8" | 1 | 1 | 1 | 1 | 1 | 1 | 1 | 0 |
| "9" | 1 | 1 | 1 | 1 | 0 | 1 | 1 | 0 |
| ("E" | 1 | 0 | 0 | 1 | 1 | 1 | 1 | 0) |

Figure 5:
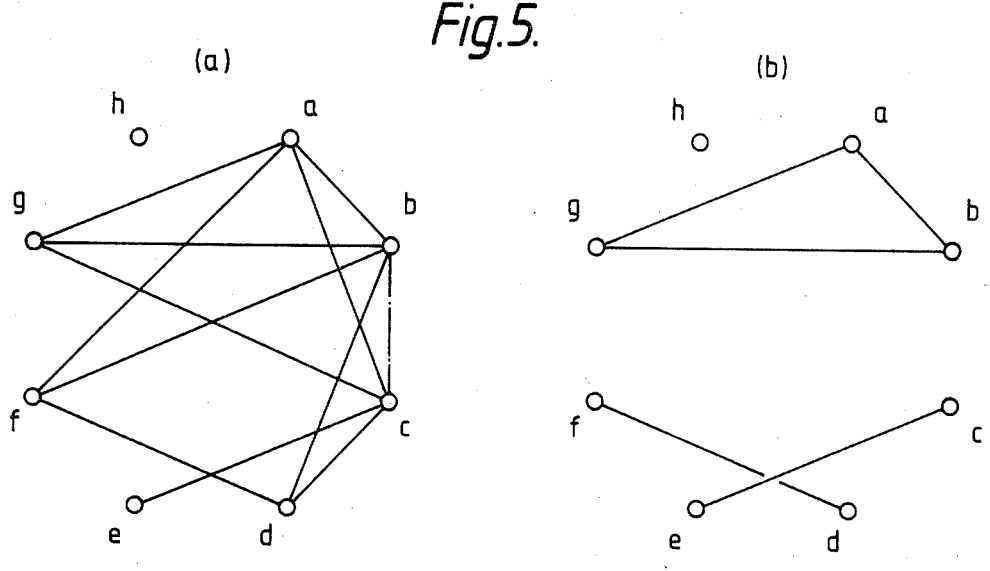
FIG. 5 shows
(a) a segment correlation graph corresponding to the 8-bar segment arrangement and the character font including the modified numeral 1 display of FIG. 2b above,
and,
(b) a sub-graph derived from this latter correlation graph.

The correlation graph for this 8-bar display, derived as before by comparing columns, is shown in FIG. 5(a). Comparing the two correlation graphs—FIGS. 3(a) and 5(a), it can be seen that the connectivity of this new graph is higher. More convenient solutions can now be found. One possible decomposition is shown in FIG. 5(b). This shows the display segments partitioned as follows:

| | |
|---|---|
| one point group - (h) | |
| two line groups - (c,e); (d,f) and, | Partition $1.2^2.3$ |
| one triangle group - (a,b,g) | |

Figure 7:
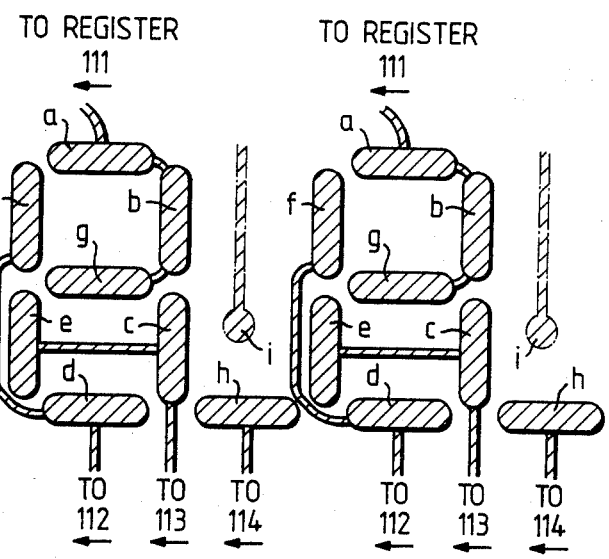

The front-plate data electrodes defining the display segments a to h are shown in FIG. 7. A single shaped electrode is associated with segments a, b and g, another electrode with segments c and e, another with segments d and f, and a fourth electrode with segment h. Each display unit therefore requires only 4-data address electrodes. To simplify illustration, only two adjacent units are shown in the figure.

Figure 6:
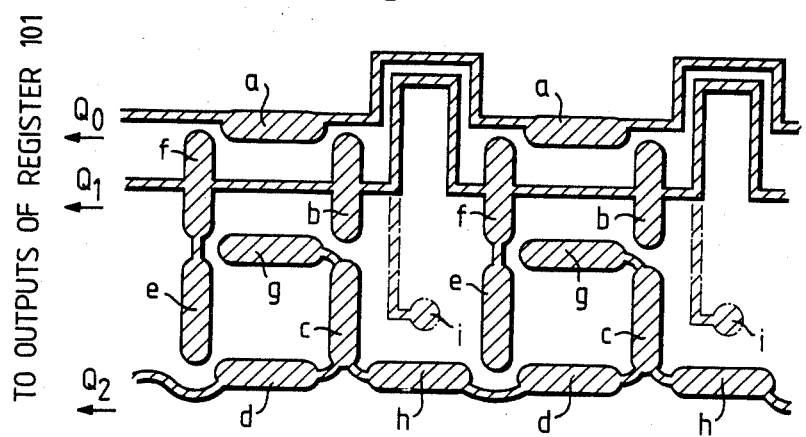
FIGS. 6 and 7 are plan drawings of the back and the front electrodes, respectively, for a display panel having several adjacent 8-bar segment display units.

The group of largest dimension, the group (a,b,g) includes three segments, thus a minimum of three electrodes are required on the back-plane to apply the required strobe address. One suitable choice of electrode layout is shown in FIG. 6, the strobe-function assignment chosen being as follows:

| (a, b, g); | (c, e); | (d, f); | (h) |
|---|---|---|---|
| ↓ | ↓ | ↓ | ↓ |
| $(f_1, f_2, f_3)$; | $(f_3, f_2)$; | $(f_3, f_2)$; | $(f_3)$ |

Thus the back-plane electrodes are associated one with segment a, another with segments b, f and e, and a third with segments g, c, d and h. This particular arrangement is convenient because the electrodes of adjacent display units may be joined in a continuous series, using the arrangement of FIG. 6 as a repeat pattern. The different partitions of an 8-segment unit are tabulated below—Table 4—and for the chosen partition—$1.2^2.3$—the number of external connections required for 8-digit display is 35, a further elimination of some seven external connections.

TABLE 4

| CONNECTION COUNT | | | |
|---|---|---|---|
| Format: 8-bar; | No of Units (N = 8) | | |
| | | No of CONNECTIONS | |
| PARTITION | No of GROUPS | General N | N = 8 |
| 8 | 1 | 8 + N | 16 |
| 1.7 | 2 | 7 + 2 N | 23 |
| 2.6 | " | 6 + 2 N | 22 |

TABLE 4-continued

CONNECTION COUNT
Format: 8-bar; No of Units (N = 8)

| PARTITION | No of GROUPS | No of CONNECTIONS General N | N = 8 |
|---|---|---|---|
| 3.5 | " | 5 + 2 N | 21 |
| $4^2$ | " | 4 + 2 N | 20 |
| $1^2.6$ | 3 | 6 + 3 N | 30 |
| 1.2.5 | " | 5 + 3 N | 29 |
| 1.3.4 | " | 4 + 3 N | 28 |
| $2^2.4$ | " | 4 + 3 N | 28 |
| $2.3^2$ | " | 3 + 3 N | 27 |
| $1^3.5$ | 4 | 5 + 4 N | 37 |
| $1^2.2.4$ | " | 4 + 4 N | 36 |
| $1^2.3^2$ | " | 3 + 4 N | 35 |
| → $1.2^2.3$ | " | 3 + 4 N | 35 ← |
| $2^4$ | " | 2 + 4 N | 34 |
| $1^4.4$ | 5 | 4 + 5 N | 44 |
| $1^3.2.3$ | " | 3 + 5 N | 43 |
| $1^2.2^3$ | " | 2 + 5 N | 42 |
| $1^5.3$ | 6 | 3 + 6 N | 51 |
| $1^4.2^2$ | " | 2 + 6 N | 50 |
| $1^6.2$ | 7 | 2 + 7 N | 58 |
| $1^8$ | 8 | 1 + 8 N | 65 |

The character display may be used as part of a more comprehensive display—for example, as the digital display part—the odometer or odometer/tripmeter display part—of a car dashboard display. An analogue car dashboard display driven by isogonal waveform signals is described in co-pending GB Patent Applicaion No. 2,206,298A. The digital display described may be incorporated as a useful addition to this display, and since strobe connections are already provided for analogue display, only 32 additional connections are required for 8-digit display—eg 3-digit tripmeter and 5-digit odometer.

Figure 8:
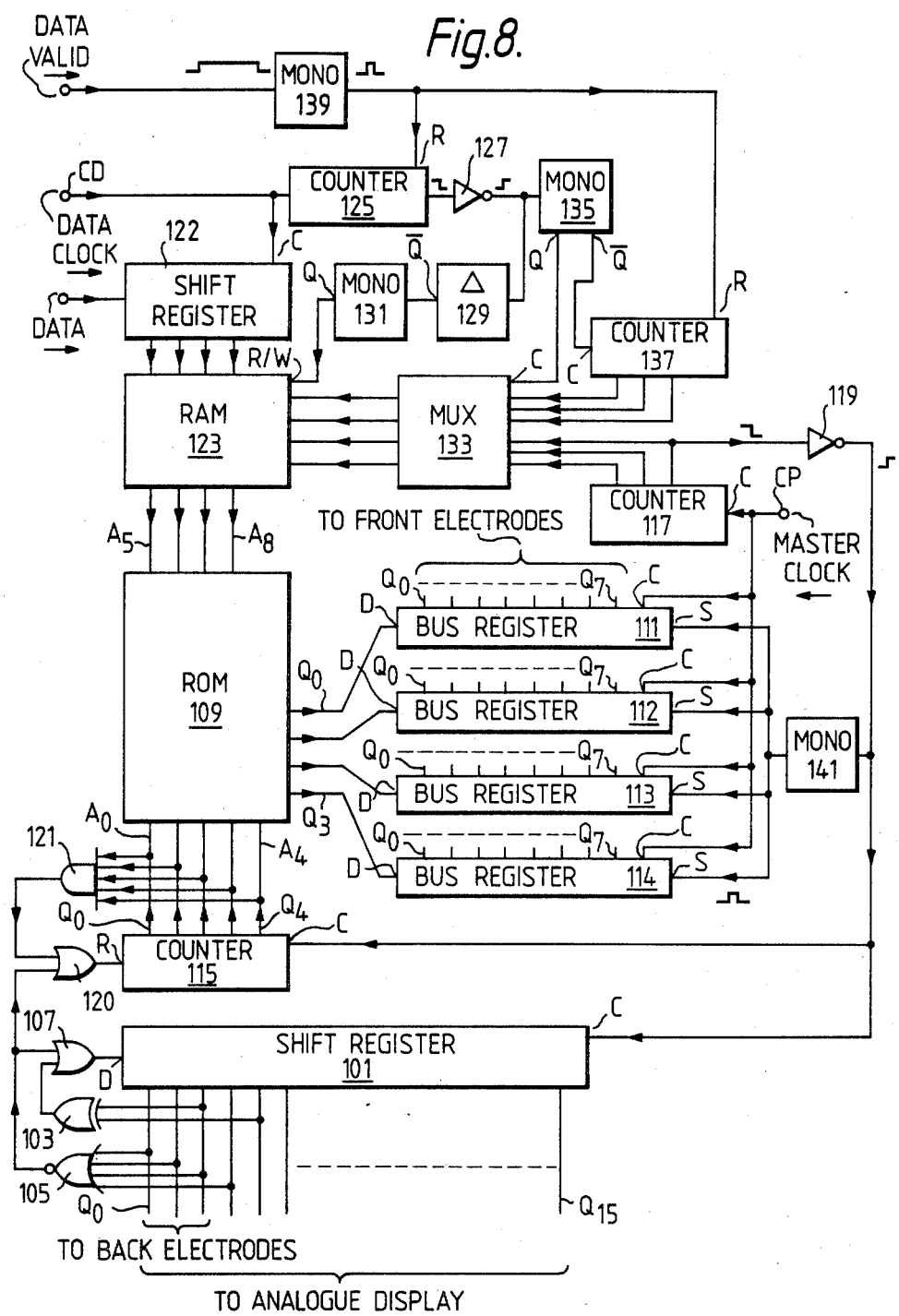
FIG. 8 is a circuit diagram of the control electronics adopted for a display panel having eight adjacent 8-bar segment display units with electrodes connected and arranged in the manner shown in the preceding FIGS. 6 and 7.

A control circuit for driving the 8-digit 8-bar segment display is shown in FIG. 8. In this circuit a 16-bit static shift register 101 is used to generate the isogonal waveform signals—in fact pseudo-random binary sequence (prbs) signals—required to strobe the three back-plane electrodes. The pseudorandom sequencing is introduced by feedback; the third register output line $Q_2$, and the fifth output line $Q_4$, ie two of the sixteen output lines $Q_0$ to $Q_{15}$, are connected to the register input D via an exclusive OR gate 103. To introduce self-starting capability, the first four output lines of the register 101, lines $Q_0$ to $Q_3$, are coupled to this same input D via a NOR gate 105 and both OR and NOR gate outputs connected to this input D by an additional OR gate 107. Sixteen orthogonal prbs waveform signals are generated, one on each line $Q_0$ to $Q_{15}$, when clock pulses derived and divided down from a master clock CP are applied to the clock input C of the register 101. This shift register 101 is somewhat larger than would be required to produce three strobe signals. However, the larger register 101 described here generates as many signals as may be required for analogue display—here sixteen as required for the analogue display described in co-pending patent application GB Pat. No. 2,206,298A. The output lines $Q_0$ to $Q_2$ of the register 101 are connected to the three back-plane electrode connections, the connections for the $f_1f_2f_3$-electrodes (cf FIG. 6) via drive amplifiers (not shown). The prbs waveforms are repeated after every thirty-one bits.

Selected orthogonal prbs signals for driving the 8×4 front-plane electrodes are synthesized bit by bit using a 512×4-bit pre-programmed read-only memory ROM 109 which serves four 8-bit shift-and-store bus registers 111 to 114, the data input D of each of these registers 111 to 114 being connected to the four read outputs $Q_0$ to $Q_3$ of the ROM 109. The eight bus line outputs $Q_0$ to $Q_7$ of each of these registers are connected via drive amplifiers (not shown) to a different one of the eight display units; each register is dedicated to serve a different one of the four front-plane electrodes of each display unit. Thus the first bus line output $Q_0$ of each register 111 to 114 is connected to the most significant digit display unit; . . . ; the last bus line output $Q_7$ of each register 111 to 114 is connected to the least significant digit display unit. The first register 111 serves the front-plane electrodes corresponding to the segments a,b and g; . . . ; the fourth register 114 serves the front-plane electrodes corresponding to segment h.

The ROM 109 memory is pre-programmed in sixteen blocks of 32×4 bits—each block is dedicated to the display of a particular character. For display of the ten numerals "0" to "9" only ten of these blocks therefore are utilized. In each block, each row of 32 bits—in fact only 31 bits in each case are utilized—replicates a 31 bit prbs waveform, one of the waveforms produced by the shift register 101 output lines $Q_0$ to $Q_2$ to one other waveform orthogonal to these—eg the waveform on output line $Q_3$, whichever is required by the particular one of the four front-plane eletrodes served by that row for display of the character particular to that block. The ROM 109 has nine address inputs $A_0$ to $A_8$. The address on four of these inputs $A_5$ to $A_8$ determines the memory block from which stored data is read. At any one time, the address on these inputs $A_5$ to $A_8$ is a 4-bit word coded for a particular character to be displayed. The particular 4 bits read from the four read outputs $Q_0$ to $Q_3$ of the ROM 109, chosen from the addressed block, one bit from each 31-bit row, are dependent on the phase of the generated strobe signals, this phase being indicated by a five-bit address on the remaining address inputs, inputs $A_0$ to $A_4$. This five-bit address is provided from the outputs $Q_0$ to $Q_4$ of a 5-bit binary counter 115. This counter 115 is clocked at the same rate as the shift register 101 at one eighth the master clock frequency. The clock signal for this counter 115, and for the shift register 101, are derived from the master clock CP via a divide-by-eight 3-bit counter 117 and an inverter 119. The reset input R of the 5-bit counter 115 is connected to the output of NOR-gate 105 via a reset OR-gate 120 to enable start reset. The five output lines $Q_0$ to $Q_4$ of the 5-bit counter 115 are connected to an AND-gate 121, the output of the AND-gate 121 being connected to the reset input R of the 5-bit counter 115 via the reset OR-gate 120. This restricts the counter 115 to 0 to 30 count. The counter is reset every 31 clock pulses.

The remaining components of this circuit are provided for the storage of input data, for addressing the ROM 109 and for co-ordinating events. The circuit has three input lines, one for data, one for data clock signal, and one for data valid signal. Input data is presented as a serial coded signal 32-bit long, ie 8×4-bit words, each word coded for the particular display character that is to be displayed by a corresponding one of the eight display units. This data is clocked into the temporary store, a 4-bit series/parallel shift register 122 under the control of the data clock CD. The data temporarily stored in this register is read out, one 4-bit word at a time and written into a data store, a random access memory RAM 123. The read/write mode of this RAM 123 is controlled by a monopulse signal derived from the data clock CD via a divide-by-four 2-bit binary counter 125, an inverter 127, a monopulse delay 129 and a monostable 131. Each data word stored in the shift register 122 is written into a selected memory address of the RAM 123 following every fourth data clock pulse. The memory address, which is incremented following each write pulse, is selected by a 3×2:1 multiplexer 133. The multiplexer 133 is clocked at one quarter of the data clock frequency, the clock signal being derived from the data clock CD via the 2-bit counter 125, the inverter 127 and a monostable 135. The output of multiplexer 133 is determined by a 3-bit counter 137 clocked at one quarter of the data clock frequency. The clock pulses for this counter 137 are provided from the inverting output $\bar{Q}$ of the monostable 135. Both the 2-bit counter 125 and the 3-bit counter 137 are reset at start of data, ie when the data valid line goes Hi, the reset inputs R of these counters being connected to the data valid line via a monostable 139.

The multiplexer 133 is also connected to the 3-bit counter 117, and when switched to relay the signals on the output of this counter 117, provides the read-out address for RAM 123.

Operation of this circuit will now be described:

LOADING DATA

1. The DATA VALID line rises Hi at start of data and resets counters 125 and 137.
2. The data clock CD clocks data bits into the S/P shift register 122 and clocks the 2-bit counter 125.
3. On the fourth data clock pulse, the delay monostable 129 and monostable 131 are activated and the multiplexer 133 is switched.
4. The RAM R/W delay monopulse 129 times out first and clocks pulse mono 131 to activate the R/W input of the RAM 123 to write the contents of the S/P shift register 121 into RAM address 000.
5. The delay mono 135 to the 3-bit counter 137 then times out and changes the 3×2:1 multiplexer back to read address counters 117 and clocks the 3-bit binary counter 137 to output the write address 001.
6. Steps 2 to 5 are repeated a further seven times to load successive words from the S/P shift register 122 into addresses 001 to 111 of the RAM 123.
7. The data is now loaded in the RAM 123, the DATA VALID line goes Lo and the data clock line remains Lo.

DISPLAYING DATA

1. The 16-bit static shift register 101 is self-starting and outputs sixteen 31-bit prbs waveform signals on its output lines $Q_0$ to $Q_{15}$, one bit every eight master clock pulses. On start, the 5-bit binary counter 115 is reset and counts 0 to 30 in synchronism with the prbs bit rate—ie at one eighth of the master clock frequency.
2. The master clock CP clocks the 3-bit read address counter 117 to output sequentially the data values stored in the RAM 123.
3. These address the address inputs $A_5$ to $A_8$ of the ROM 109 and cause the appropriate bits of the desired prbs waveforms to be loaded into the four shift-and-store bus registers 111 to 114. These registers 111 to 114 are then strobed at one eighth of the master clock frequency by a monostable 141 connected to the inverter 119 following the read address counter 117. The 5-bit binary counter 115 is incremented so that the next bits of the desired prbs waveforms are output from the ROM 109 during the next eight master clock pulses.

Figure 9:
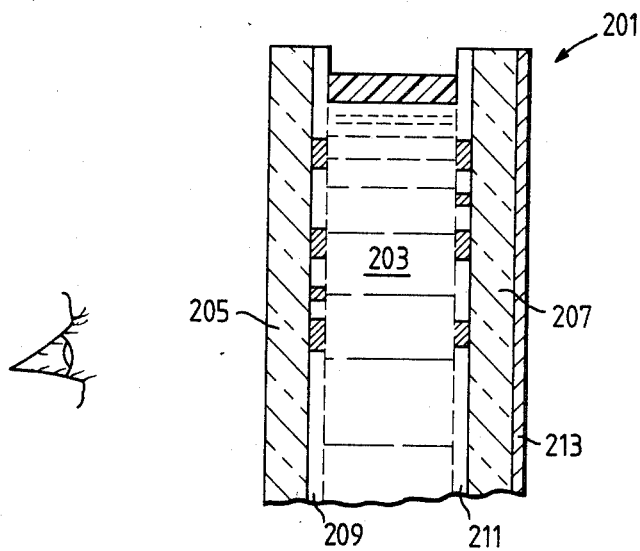
FIG. 9 is a cross-section drawing of a liquid crystal medium display panel, a panel incorporating the electrodes shown in the preceding FIGS. 6 and 7.

Details of a preferred panel construction now follow. The display panel shown in FIG. 9 is in the form of a lecithin aligned dyed phase change cell 201 incorporating a layer 203 of liquid crystal material. This material is of D82.E61 blue dyed nematic liquid crystal to which has been added approximately 3.9% by weight of CB15 cholesteric liquid crystal material. The blue anthraquinone dichroic dye D82 is given by the structural formula:

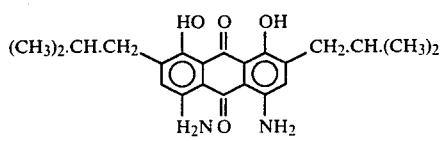

This dye—4,5-diamino-2, 7-di-isobutyl-1, 8-dihydroxy anthraquinone—is described in UK Patent Application No. GB. 2,081,736A.

The liquid crystal materials E61, CB15 and the dyed nematic material D82.E61 are listed in the trade catalogues of BDH Ltd, Poole, Dorset, England.

The liquid crystal layer 203 is encloed between two glass support plates 205 and 207 and is approximately 9 microns thick to give an acceptable theshold voltage characteristic of about 5 volts. The plates 205 and 207 are each 4 mm thick and have been coated with 30Ω/□ indium tin oxide, and etched to give the electrode configuration shown in FIGS. 6 and 7 above, the electrodes front and back, 209 and 211, overlapping to define eight adjacent display units. The back plate 207 of the panel cell 201 is backed by a white card reflector 213. This reflector 213 has been tinted slightly yellow to give a neutral gray color appearance in the display background.

For this panel the data clock rate chosen is approximately 32 kbaud giving a load time of approximately 1 msec. The frame rate is around 30 Hz to give flicker free display, the master clock running therefore at 31×8×30=8 kHz. Whilst the loading and display sequences may overlap and as a consequence signal data may become corrupted, the load time is so small—approx 1 msec—that in practice the effect is imperceptible.

In general terms, for the 8-segment display of FIG. 1(b) above, the optimal electrode interconnections of "front" electrodes suitable for isogonal-signal address are listed below:

| | |
|---|---|
| (a,b,g) (c,e) (d,f) (h); | Partition 1 $2^2$ 3 |
| (b,d,f) (a,g) (c,e) (h); | |
| (a,c,g) (b,d,f) (e) (h) | Partition $1^2$ $3^2$ |

The latter two of the above arrangements are less favorable than the first for it is difficult to design simple electrode patterns having the desired connectivity.

Each of these arrangements of the "front" electrodes may be combined with any arrangement of "back" electrodes in which each member of each set of connected "front" electrodes overlaps a different "back" electroode. For example, in the first arrangement of interconnections listed above the allowed overlaps are of the form:

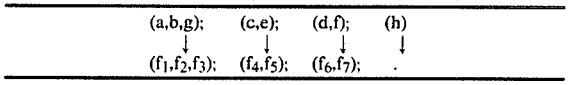

where preferably $f_4, f_5$ are two different members of the set $f_1, f_2, f_3$ and likewise $f_6, f_7$ and furthermore the electrode associated with segment h may overlap any "back" electrode.

Examples of 7-segment and 8-segment display of the numeral characters "0" to "9" have been discussed above. The invention is however not so limited and is applicable to displays using other segment content and design, and for displaying other characters.

Decimal point indication can be included readily for either the 7-segment display, as shown in FIG. 4 (broken outline) or the 8-segment display, as shown in FIGS. 6 and 7 (broken outline) by including an additional segment, segment i. This requires one additional electrode for each display location. For the 7-segment display, this electrode can be designed to overlap with either the $f_1$ common "back" electrode or the $f_2$ common "back" electrode (as shown in FIG. 4). This corresponds to the signal assignment:

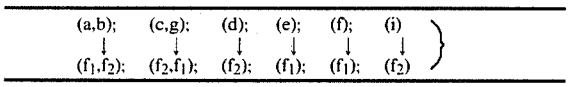

For the 8-segment display, this electrode can be designed to overlap with either the common electrode bearing $f_2$ ($Q_1$ of FIG. 6, as shown) or $f_3$ ($Q_2$ of FIG. 6). Based on this arrangement, the signal assignment is:

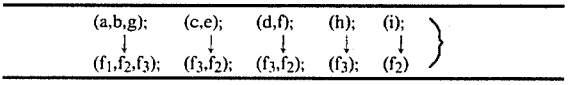

[It is noted that the electrodes $Q_0, Q_1$ (FIG. 6) are configured to avoid any overlap with the i-segment electrode (FIG. 7) at other parts of the display area.]

Although the invention disclosed here has particular advantages for driving displays based on the dyed or undyed cholesteric-to-nematic phase change effect, it may also be advantageous for devices using nematic or long pitched cholesteric materials. Thus for example the method described hereinbefore may be preferred to multiplexed drive for variable birefringence displays or single polarizer guest-host displays. Furthermore, the invention may be used for applications using low voltage circuitry or requiring wide temperature operation. Low threshold materials such as E24LV or E31LV (supplied by BDH Chemicals Ltd) or wide temperature range materials such as biphenyl mixtures (see GB Pat. No. 1452826) for example the materials E43, E44 (supplied by BDH Chemicals Ltd) may be used.

It is to be understood that the terms "front" and "back" as applied to the electrodes hereinbefore have no special significance. The terms serve only to distinguish those electrodes that are associated with particular display locations (the "front" electrodes shown in FIGS. 4 and 7) from those electrodes that are common to all adjacent locations (the "back" electrodes shown in FIGS. 4 and 6).

I claim:

1. A multi character electrically addressable display device, capable of displaying each one of a plurality of different display characters at a plurality of display locations, comprising:

(i) a layer of an electrically addressable medium;
(ii) two substrates spaced apart and containing said layer;
(iii) first and second sets of electrodes facing one another on said substrates at each character display location, the electrode sets collectively being in the form of segments providing display characters between facing pairs of segments; the first electrode set comprising a plurality of electrodes of which at least one electrode has connected thereto a group of at least two segments and at least one other electrode has connected thereto a group of at least one segment; the second electrode set comprising a plurality of electrodes each connected to at least one segment and each electrode being associated with no more than one segment from each group of segments in the first electrode set, the number of electrodes in the second set being at least equal in number to the greatest number of segments connected to any one electrode in the first set of electrodes, similar electrodes in successive display locations being connected together;
(iv) means for entering information relating to a required display character;
(v) means for generating a set of isogonal waveform signals wherein each waveform signal is different from every other waveform signal in the set;
(iv) means for simultaneously applying a different one of the waveform signals to each electrode in the second set of electrodes; and
(vii) means for selecting the phrase-waveform signals from said set of waveform signals and applying one of the selected signals simultaneously to each electrode in the first set of electrodes, said selection being related to the character to be displayed and the waveform signals applied to the second set of electrodes whereby a voltage above a display threshold is produced between each selected facing pair of segments and a voltage of substantially zero value appears between each nonselected pair of facing segments, to collectively display a desired character.

2. The display device of claim 1 wherein said device is capable of displaying numbers 0 to 9, or 0 to 9 and an exponent symbol E, said two sets of electrodes being arranged in a seven segment (a) to (g) figure of eight formation, the electrodes in the first set of electrodes being arranged with two electrodes each connected to two segments and three electrodes connected to a single segment.

3. The display device of claim 2 wherein the electrodes in the first set of electrodes are arranged with segments (a) and (b) connected to one electrode, segments (g) and (c) connected to another electrode, and segments (d), (e) and (f) connected to separate electrodes respectively.

4. The display device of claim 3 wherein the electrodes in the second set of electrodes include an electrode connected to segments (a), (e), (f), and (g) and another electrode connected to segments (b), (c), and (d).

5. The display device of claim 1 wherein said device is capable of displaying numerals 0 to 9, or 0 to 9 and an exponent symbol E, said two sets of electrodes being arranged as eight segments (a) to (h) with seven segments in a figure of eight formation and one segment adjacent one corner of said figure of eight formation, the electrodes in the first set of electrodes being arranged with at least one electrode connected to three segments and at least one other electrode connected to one segment.

6. The display device of claim 5 wherein the electrodes of the first set of electrodes are connected so that one electrode is connected with three segments (a), (b) and (g), one other electrode is connected with one pair of segments (c) and (e), one further electrode is connected with another pair of segments (d) and (f), and one still further electrode is connected with one segment (h).

7. The display device of claim 6 wherein the electrodes of the second set include an electrode connected with one segment (a), another electrode connected with three segments (b), (e), and (f), and a further electrode connected with four segments (c), (d), (g), and (h).

8. The display device of claim 1 wherein the first set of electrodes further includes an electrode for defining and displaying a decimal point.

9. A display device as claimed in claim 1 wherein the different isogonal signals are pseudo-random binary sequence code signals.

10. The display device of claim 1 arranged to display character and analogue values, said display device further comprising additional electrodes on both substrates and defining by their overlap an analogue display area, said additional electrodes being connected to receive said isogonal waveform signals.

* * * * *